United States Patent [19]
Runkle Dean E.

[11] 3,747,475
[45] July 24, 1973

[54] BY-PASS FLOW DIFFUSER
[75] Inventor: Dean E. Runkle, South Bend, Ind.
[73] Assignee: The Bendix Corporation, South Bend, Ind.
[22] Filed: July 12, 1972
[21] Appl. No.: 270,917

[52] U.S. Cl........................ 91/445, 91/391, 91/450, 91/469
[51] Int. Cl...................... F15b 11/08, F15b 13/04
[58] Field of Search...................... 91/449, 450, 469, 91/391, 445; 60/54.6 P; 137/596, 625.68

[56] References Cited
UNITED STATES PATENTS

| | | | |
|---|---|---|---|
| 3,610,102 | 10/1971 | Brown, Jr. | 91/469 |
| 3,633,462 | 1/1972 | Goscenski | 91/450 |
| 3,693,654 | 9/1972 | Runkle | 91/391 X |

*Primary Examiner*—Irwin C. Cohen
*Attorney*—Ken C. Decker et al.

[57] ABSTRACT

A hydraulic brake booster is disclosed which includes a housing defining a pressure chamber therewithin in which a boost piston reciprocates and which is also provided with an inlet port connected to the fluid pressure source, an outlet port, and a return or exhuast port communicated to a fluid reservoir. A spool valve is slidably mounted in the housing and is shiftable from a first or brake released position in which the pressure chamber is vented to the reservoir and in which substantially all of the fluid flowing to the inlet is communicated directly to the outlet, to a second position in which fluid flow between the inlet and the outlet is severely restricted and the high pressure fluid at the inlet is communicated into the booster pressure chamber where it acts upon the boost piston to effect a brake application. A by-pass passage is provided between the inlet and outlet port to insure a minimum level of fluid communication between the inlet and outlet even when the spool valve is disposed in the second position. The by-pass passage includes a first flow-restricting orifice which communicates the inlet with a cavity, and a second flow-restricting orifice or diffuser which communicates the cavity to the outlet ports. The two orifices are so designed that the pressure drop across the first orifice is much greater than the pressure drop across the second orifice or diffuser, thereby providing a substantially noiseless valve which may be easily manufactured.

10 Claims, 2 Drawing Figures

3,747,475

3,747,475

BY-PASS FLOW DIFFUSER

BACKGROUND OF THE INVENTION

This invention relates to a hydraulic brake booster for use on automotive vehicles.

Although vacuum boosters are principally used in existing automobiles to provide a power assist to the vehicle operator when the vehicle's brakes applied, these vacuum units are expected to be replaced by hydraulically actuated units in future automobile production. Hydraulic brake boosters are designed to utilize the fluid pressure output of the vehicle's power steering pump as a power source to effect a brake application. However, if the power steering pump must also apply fluid to the power steering gear at all times, it is necessary to provide a by-pass orifice within the brake booster that assures that sufficient flow of fluid will be communicated to the vehicle's power steering gear. This by-pass orifice, of course, must be of extremely simple design so that the booster may be produced at a minimum cost. Furthermore, in order to be commercially acceptable, the valve mechanism in the brake booster must be substantially noise free. By-pass orifices used in prior art boosters were deficient in that during a hard brake application, the by-pass orifices were very noisy.

SUMMARY OF THE INVENTION

Therefore, an important object of my invention is to provide a by-pass passage for a hydraulic brake booster which is of extremely simple design so that the booster may be manufactured at a minimum cost.

Another important object of my invention is to provide a by-pass passage for a hydraulic brake booster which is substantially noise free even when a brake application requiring maximum pressure levels in the booster pressure chamber is effected.

DETAILED DESCRIPTION

Figure 1:
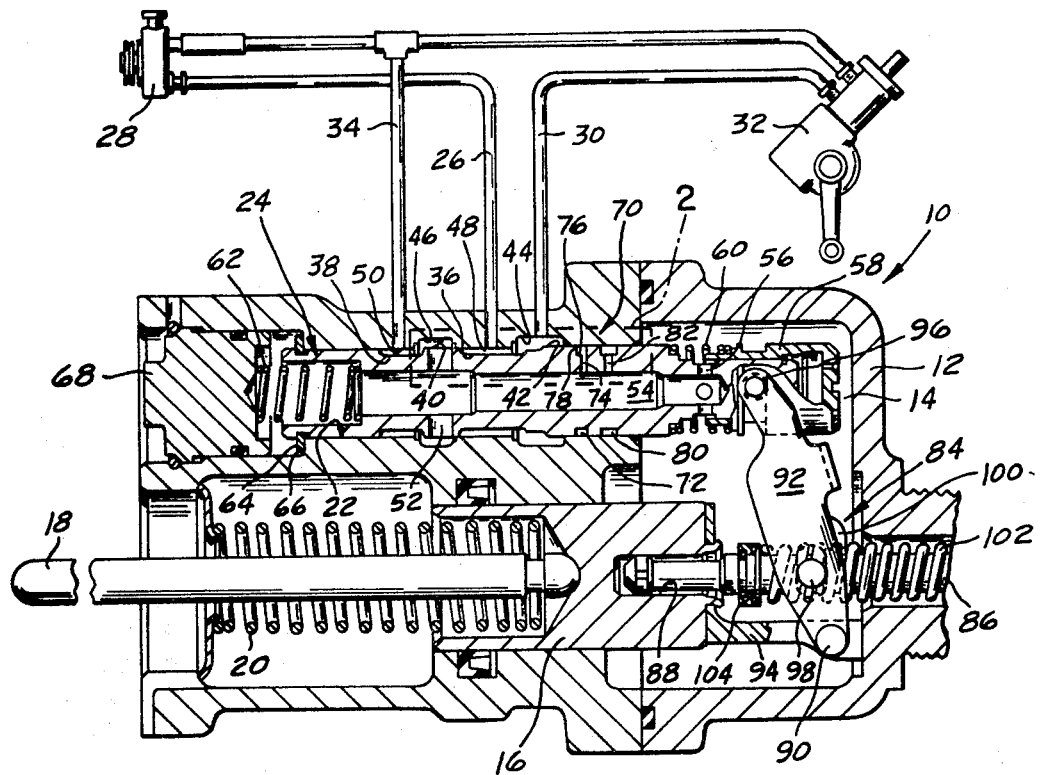
FIG. 1 is a transverse cross-sectional view of a brake booster made pursuant to the teachings of my present invention.

Referring now to the drawings, a brake booster generally indicated by the numeral 10 includes a housing 12 which defines a pressure chamber 14 therewithin. A boost piston 16 is slidably mounted within the housing 12, and one face of the latter is exposed to the pressure level existing in the booster chamber 14. An output member 18 transmits movement of the piston 16 to a standard automotive master cylinder (not shown) mounted just to the left of the housing 12. A return spring 20 yieldably urges the piston 16 to the right viewing the FIG. 1, toward the brake release position.

Housing 12 is further provided with a bore 22 therewithin which slidably receives a spool valve generally indicated by the numeral 24 which controls communication between an inlet 26 connected to the output or high pressure side of the vehicle's power steering pump 28, an outlet port 30, which is connected to the inlet of the vehicle's power steering gear 32 and a return or exhaust port 34 which is connected to a reservoir (not shown) at the inlet or low pressure side of the power steering pump 28. The outlet of the gear 32 is also communicated with the aforementioned reservoir at the inlet of the power steering pump 28. The spool valve 24 is provided with grooves 36, 38, and lands 40, 42 which cooperate with corresponding grooves 44, 46 and lands 48, 50 on the wall of the bore 24 to control fluid communication between the inlet, outlet and exhaust ports. The groove 46 is communicated into the pressure chamber 14 through a radially extending passage 52, a longitudinal passage 54 defined within the valve spool 24, and normally opened radial passages 56 which permit flow of fluid from the passage 54 into the pressure chamber 14. However, a secondary valve sleeve 58 is slidably mounted on the end of the valve spool 24 and is slidable from a first position illustrated in the drawings in which flow of fluid is permitted into the pressure chamber 14 through the passages 56, to a second position in which the sleeve 58 closes the passages 56 to thereby preclude fluid communication into the pressure chamber 14. A spring 60 yieldably urges the sleeve 58 towards the first position. The strength of the spring 60 is much greater than the strength of the valve return spring 62, so that forces transmitted to the sleeve 58 will first shift the valve spool 24 before permitting the sleeve 58 to close the passages 56.

The spool valve 24 is shiftable from a first or brake release position illustrated in the drawings which is defined by engagement of a stop ring 64 carried on the end of the spool 24 with a shoulder 66 provided on the bore 22 to a second or brake applied position defined by engagement of the end of the spool 24 with a plug 68 which closes the bore 22.

Figure 2:
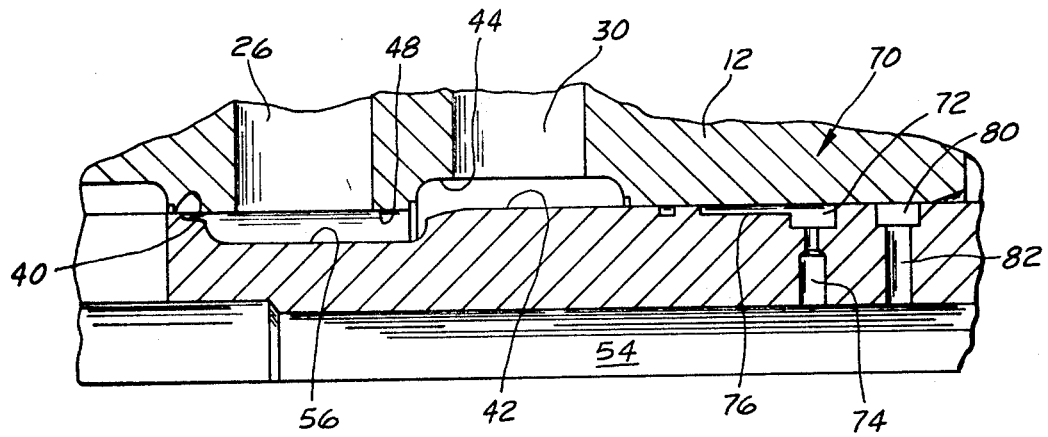
FIG. 2 is an enlarged, detailed, cross-sectional view of the circumscribed portion of FIG. 1.

A by-pass passage means generally indicated by the numeral 70 is provided through the valve spool 24 to insure a minimum level of fluid communication between the inlet and outlet port at all times during operation of the booster to assure that the steering gear 32 will automatically be provided with an adequate fluid supply. The by-pass passage means 70 includes an annular groove 72 which is communicated to the passage 54 by a flow-restricting orifice 74. The outer circumferential surface of the valve spool 24 is stepped to provide a smaller diameter portion 76 which extends from the larger diameter land 42. The axial length of the smaller diameter portion 76 is such that when the valve spool is disposed in the first or brake release position as illustrated in FIGS. 1 and 2, the larger diameter land 42 engages the wall of the bore 22 so that fluid communication is prevented between the groove 72 and the groove 44. However, when the spool valve is shifted to the second, or brake-fully-applied position, the spool valve 24 moves a sufficient amount to communicate the smaller diameter portion 76 with the groove 44 to provide a path for fluid communication between the grooves 72 and the outlet 30. The diameter of the reduced diameter portion 76 is large enough so that the latter cooperates with the wall of the bore 24 to define a flow-restricting orifice therebetween when communication is permitted between the groove 72 and the groove 44. However, the pressure drop through the orifice 74 between the passage 54 and the groove 72 is much greater than the pressure drop through the orifice 76, so that the latter acts as a diffuser to prevent undesirable noise due to fluid flow through the spool valve when the latter is disposed in the second or brakes-fully-applied position. A second annular groove 80 circumscribes the spool valve 24 at a cross section between the groove 72 and the pressure chamber 14.

Groove 80 is communicated to the groove 54 by a passage 82, so that high pressure fluid is always communicated to the interface between the spool valve and the bore 22, to prevent pressure leakage from the pressure chamber 14 after the valve sleeve 58 has closed the passages 56 to prevent further high pressure fluid from being communicated into the pressure chamber 14.

The spool valve is actuated to effect a brake application by operator-operated actuating means generally indicated by the numeral 84. Operator-operated means 84 include an input rod 86, one end of which is connected to the usual brake pedal (not shown) located in the vehicle operator's compartment. The other end of the input rod 86 is slidably received in a blind bore 88 defined within the piston 16. A first pivot 90 connects a lever means 92 to a bracket 94 which is carried by the piston 16. A second pivot 96 connects the opposite end of the lever means 92 to the sleeve 58. A third pivot 98 connects the lever 92 to a bracket 100 slidably mounted on the input rod 96. A spring 102 yieldably urges the bracket 100 into engagement with a stop ring 104 secured to the input rod 96, so that movement of the input rod 96 to the left viewing FIG. 1 will normally pivot the levers 92 to shift the spool valve 24. However, when a malfunction prevents a powered operation of the booster 10, the spring 102 yields to permit the end of the input rod 86 to engage the end of the blind bore 88 so that a straight-through mechanical link exists between the brake pedal and the master cylinder to permit the vehicle operator to manually apply the brakes of the vehicle.

MODE OF OPERATION

The various components of the brake booster 10 are illustrated in FIG. 1 in positions which they assume when the brakes of the vehicle are released. In this position, the end of the land 42 is separated from the end of the land 48 to define a passage therebetween communicating the groove 36 with the groove 44 such that substantially uninhibited fluid communication is permitted between the inlet 26 and the outlet 30. At the same time, communication is prevented between the groove 36 and the groove 46, so that the pressure chamber 14 is vented to the low pressure side of the pump 28 through the passages 56, 54, 52, the grooves 46 and 38, and the return port 34. When a brake application is effected, movement of the input rod 86 is transmitted through the spool valve 24 through the lever means 92 and the sleeve 58, it being remembered that the strength of spring 60 is much greater than the strength of spring 62 so that movement of the levers 92 is translated directly into movement of the spool valve 94. As the spool valve 24 is shifted, the land 40 is engaged with land 50 to thereby terminate fluid communication between the pressure chamber 14 and the return 34, communication between the groove 36 and the groove 46 is initiated to initiate fluid communication between the inlet 26 and the pressure chamber 14, and the passage defined between the lands 42 and 48 is reduced, thereby restricting flow to the outlet 30 and increasing the fluid pressure level in the groove 36 which, as mentioned hereinabove, is communicated into the pressure chamber 14. Fluid pressure in the pressure chamber 14 acts across the right-hand end of the piston 16, to urge the latter to the left, thereby effecting a brake application in the normal manner.

During a very hard brake application, the spool valve 24 may be shifted to the second or brake-fully-applied position defined by the engagement of the end of the spool valve 24 with the plug 68. In this condition the land 42 is lapped with the land 48 to substantially prevent fluid communication between the grooves 36 and 42. However, a minimum level of fluid communication between the inlet 26 and outlet 30 is assured through the by-pass passage means 70. The relatively high pressure fluid communicated from the inlet 26 into the passage 54 communicates through the orifice 74 into the groove 72, and then through the small passage defined between the small diameter portion 76 and the wall of the bore 22 into the groove 42. It should be noted that the flow-restricting orifice 74 causes the pressure in the groove passage 54 to drop to within five per cent of the pressure level existing in the outlet 30. Therefore, the remaining five per cent of pressure drop occurs through the diffuser defined by the smaller diameter portion 76 of the spool valve 24 and the wall of the bore 22.

After the spool valve 24 is shifted to the second or brake-fully-applied position, further actuation of the lever means 92 collapses spring 60 to shift the valve sleeve 58 relative to the spool valve 24 to thereby close the passages 56 to prevent further communication of high pressure fluid into the pressure chamber 14. Therefore, the pressure level in the latter is limited to a predetermined safe maximum pressure level. However, the pressure in the pressure chamber 14, which is at a relatively high pressure level, tends to leak through the interface between the spool valve 24 and the wall of the bore 22 to the groove 72 and then to the outlet port 30. This is very undesirable, since if the pressure in the chamber 14 is reduced an appreciable amount, the hydraulic forces acting on the opposite end of the spool valve 24 will become unequal, making actuation or release of the spool valve 24 very difficult. Therefore, the fluid pressure level in the passage 54 is communicated to the interface between the spool 24 and the bore 22 through the passage 82 into the groove 80. High pressure fluid at this interface prevents fluid from leaking from the pressure chamber 14, thus preserving the integrity of the latter.

I claim:
1. In a hydraulic brake booster:
a housing defining a pressure chamber therewithin;
a piston slidable in said chamber;
said housing having an inlet communicated with a fluid pressure source and an outlet and an exhaust;
operator-operated valve means disposed within said housing and actuatable from a first position in which substantially uninhibited fluid communication between the inlet and outlet is permitted, the chamber is open to said exhaust, and fluid communi-cation between said inlet and said pressure chamber is prevented to a second position in which fluid communication between said inlet and outlet is sub-stantially restricted, the exhaust is closed, and said inlet is communicated to said pressure chamber to slide said piston; and
by-pass passage means on said valve means communicating the inlet with the outlet to insure a minimum level of fluid communication from the inlet to the outlet when said valve means is disposed in the second position, said by-pass passage means being closed when the valve means is in the first position, said by-pass passage means including a fluid receiving cavity, a flow restricting orifice communicating the fluid pressure level at said inlet with said cacity, and a diffuser passage communicating said cavity with said outlet.

2. The invention of claim 1:
said housing defining a bore therewithin communicating with the inlet, the outlet, and the pressure chamber;
said valve means including a spool valve slidably mounted in said bore, and shiftable between said first and second positions;
at least a portion of said by-pass passage means extending through said spool valve.

3. The invention of claim 2:
said spool valve defining a passage therewithin communicating said inlet with the pressure chamber when the spool valve is disposed in said second position to permit the high pressure fluid at said inlet to communicate into said pressure chamber;
said fluid-receiving cavity being defined within the wall of said spool valve, said orifice communicating the passage defined within said spool valve into said cavity.

4. The invention of claim 3:
said fluid-receiving cavity being a circumferentially extending groove in the outer circumferential surface of said spool valve cooperating with the wall of said bore to define said cavity;
said orifice extending through the wall of said spool valve in a generally radial direction to communicate said groove with the passage extending through the spool valve;
said diffuser passage being defined between the outer circumferential surface of the spool valve and the wall of said bore to communicate said groove with said outlet.

5. The invention of claim 4:
the outer circumferential surface of said spool valve being stepped to define larger and smaller diameter portions with a shoulder therebetween, said smaller diameter portion extending between said groove and said shoulder and cooperating with the wall of said bore to define said diffuser passage therebetween, the axial length of said smaller diameter portion being sufficiently long to communicate said groove with said outlet when the spool valve is disposed in said second position, the larger portion of said spool valve cooperating with the wall of said bore to block communication through said diffuser passage when said spool valve is disposed in said first position.

6. The invention of claim 4:
the outer circumferential surface of said spool valve having a groove and a land, the wall of said bore having a groove and a land cooperating with the land and the groove on said spool valve respectively to define first and second fluid compartments communicated with said inlet and outlet respectively, the opening defined between the land on the spool valve and the land on said bore being sufficiently large to permit substantially uninhibited fluid communication between the inlet and outlet when the spool valve is disposed in said first position, the size of said opening being reduced as the spool valve is shifted toward the second position, said lands being lapped to substantially prevent fluid communication between said compartments when the spool valve is disposed in the second position;
said diffuser passage extending over an axial distance on said spool valve sufficiently long that communication is permitted between said groove and said second compartment when the spool valve is disposed in said second position.

7. The invention of claim 4:
secondary valve means carried by said spool valve and closing the passage defined within said spool valve upon additional operation of the operator-operated means after movement of the spool valve to said second position;
a second groove on the outer circumferential surface of said spool valve located between the end of said bore and communicating into said pressure chamber and said first-mentioned groove; and
a channel permitting substantially unrestricted fluid communication between the passage defined within the spool valve and said second groove whereby the high pressure fluid in said second bore permits leakage of fluid from said pressure chamber to said outlet after closure of said secondary valve means.

8. In a hydraulic brake booster:
a housing defining a pressure chamber therewithin;
a piston slidable in said chamber;
said housing having an inlet communicated with a fluid pressure source and an outlet, and an exhaust;
operator-operated valve means disposed within said housing and actuatable from a first position in which substantially uninhibited fluid communication between the inlet and outlet is permitted, the chamber is open to said exhaust, and fluid communication between said inlet and said pressure chamber is prevented to a second position in which fluid communication between said inlet and outlet is substantially restricted, the exhaust is closed, and said inlet is communicated to said pressure chamber to slide said piston; and
by-pass passage means on said valve means communicating the inlet with the outlet to insure a minimum level of fluid communication from the inlet to the outlet when said valve means is disposed in the second position, said by-pass passage means being closed when the valve means is in the first position, said by-pass passage means including a fluid receiving cavity, a first flow restricting orifice communicating said cavity with said inlet, and a second flow restricting orifice communicating said cavity with said outlet, the pressure drop across said first orifice being substantially greater than the pressure drop across said second orifice.

9. The invention of claim 8:
said housing defining a bore therewithin communicating the inlet, the outlet and the pressure chamber, said valve means including a spool valve slidably mounted in said bore and shiftable between said first and second positions, said fluid-receiving cavity including a groove on the outer circumferential surface of said spool valve cooperating with the wall of the bore to define said cavity, said first orifice extending through the wall of said spool valve to communicate said groove with the passage defined within said spool valve, said second orifice being defined between the outer circumferential surface of said spool valve and the wall of the bore and extending between said groove and the outlet when the spool valve is disposed in said second position.

10. The invention of claim 9:
the outer circumferential surface of said spool valve being stepped to define larger and smaller diameter portions with a shoulder therebetween, said second orifice being defined between the smaller diameter portion and the wall of said bore, said second orifice communicating with said outlet when the spool valve is disposed in said second position, said larger portion of the spool valve engaging the wall of said bore to prevent fluid communication through said second orifice when said spool valve is disposed in said first position.

* * * * *